Patented Dec. 14, 1926.

1,610,961

UNITED STATES PATENT OFFICE.

RICHARD METZGER, OF HEIDELBERG, GERMANY, ASSIGNOR TO I. G. FARBENINDUSTRIE AKTIENGESELLSCHAFT, OF FRANKFORT-ON-THE-MAIN, GERMANY.

PROCESS FOR DYEING CELLULOSE-ACETATE SILK.

No Drawing. Application filed July 7, 1925, Serial No. 42,045, and in Germany July 11, 1924.

My present invention has for its object to provide for an improved process of producing dyeings on cellulose acetate silk.

I have found that cellulose acetate silk can be dyed in an excellent manner with numerous insoluble or difficultly soluble compounds when dyeing is carried out in the presence of so-called fat catalytic organic saponifiers i. e. chemical compounds possessing the property of assisting the hydrolysis of fats and oils by acids, such for example as Twitchell's reagent, napthenic acids, mixed fatty acid and naphthalene-sulfonic acids, also alkylated naphthalene sulfonic acids, for example isopropylated naphthalene or butylated or isobutylated naphthalene sulfonic acids, or salts thereof.

The compounds used for dyeing with the aid of the aforesaid saponifiers may be coloring matters or colored organic compounds generally, insoluble or difficultly soluble in water, as well as components of dyestuffs, such for example as amino compounds which afterwards are diazotized on the fibre and coupled with suitable compounds, or naphthols or similar components which afterwards are to be developed with diazo compounds.

For dyeing, the compounds to be brought on the fibre may be first made into a concentrated solution, generally of a colloidal nature, or otherwise finely dispersed in a concentrated form by an addition of one or more of the aforesaid saponifiers, and a dye-bath prepared by diluting such concentrated preparation, or the dye-bath may be directly made with the compounds to be brought on the fibre while adding a saponifier.

The following examples will serve to further illustrate my present invention which however is not restricted to these examples.

Example 1.

2 parts by weight of 3-amino-benzanthrone corresponding to the formula

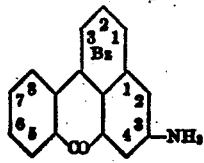

are dissolved or dispersed in a suitable amount of neutralized Twitchell's reagent and then added to from 2000 to 3000 parts of water which may contain a little soap, as usual. 100 parts of cellulose acetate silk are dyed at from 60 to 70 degrees centigr. when a beautiful strongly fluorescent yellow shade is produced.

With 1 percent of Bz 1-amino-benzanthrone corresponding to the formula

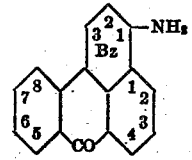

a bright red is obtained.

Example 2.

5-nitro-1.4-diamino anthraquinone is dissolved in a concentrated aqueous solution of di-isopropyl-naphthalene sulfonic acid sodium salt and added to the dye bath which should also contain about 20 grammes of concentrated neutral sulfite waste liquor per litre. With 1 percent of the coloring matter calculated on the weight of cellulose acetate silk the latter is dyed violet.

With an addition of a butylated naphthalene sulfonic acid obtained by condensing normal butanol with naphthalene sulfonic acid, 1-amino-4-anilido-anthraquinone produces a bright bottle flower blue. 10 grammes of the aforesaid sulfonic acid per litre of dye bath are a proper concentration, the dyestuff being first stirred with the sulfonic acid in a concentrated state and then added to the dyebath.

Other saponifiers and other difficultly soluble dyestuffs or coloring matters, or components of dyestuffs may be used in a similar way, for example alpha naphthylamine (diaz)+meta-phenylene-diamine, alpha amino-alpha-naphthoquinone, 8-nitro-2-amino-naphthalene, methyl violet base, alpha naphthylamine (diaz)+para-hydroxybenzoic acid and others.

What I claim is:

1. The process of producing dyeings on cellulose acetate silk, which consists in employing substances suitable for dyeing cellulose acetate silk, difficultly soluble in water, in conjunction with a fat catalytic organic saponifier 2. The process of producing dyeings on cellulose acetate silk, which consists in employing a colored anthraquinone derivative practically insoluble in water, in conjunction with a saponifier of the alkylated naphthalene sulfonic acid type.

In testimony whereof I have hereunto set my hand.

RICHARD METZGER.